United States Patent
Scherer et al.

[11] Patent Number: 5,931,736
[45] Date of Patent: Aug. 3, 1999

[54] LINER FOR ROTATING DRIVE CABLES

[75] Inventors: George M. Scherer, Binghamton; Thomas P. Dunn, Vestal; Robert L. Douglass, Binghamton, all of N.Y.

[73] Assignee: B.W. Elliot Manufacturing Co., Inc., Binghamton, N.Y.

[21] Appl. No.: 08/880,014

[22] Filed: Jun. 20, 1997

[51] Int. Cl.$^6$ .................................................. F16C 1/06
[52] U.S. Cl. .............................. 464/52; 464/183; 30/276; 56/12.7
[58] Field of Search .................... 464/52, 81, 112, 464/181, 182, 183; 138/38; 30/276; 56/12.7

[56] References Cited

U.S. PATENT DOCUMENTS

| | | | |
|---|---|---|---|
| 2,380,952 | 8/1945 | Dewey | 464/183 |
| 2,441,719 | 5/1948 | Potter | 464/52 |
| 3,472,045 | 10/1969 | Nelsen et al. | 464/52 |
| 4,424,045 | 1/1984 | Kulischenko et al. | 464/52 |
| 4,716,001 | 12/1987 | Kottke . | |
| 4,747,799 | 5/1988 | Kato | 464/52 |
| 5,243,880 | 9/1993 | Beier et al. | 464/183 |
| 5,287,768 | 2/1994 | Amborn et al. | 464/183 |
| 5,346,432 | 9/1994 | Greulich et al. | 464/183 |
| 5,364,307 | 11/1994 | Shaulis | 464/52 |
| 5,695,404 | 12/1997 | Shaulis | 464/52 |

*Primary Examiner*—Eileen Dunn Lillis
*Attorney, Agent, or Firm*—Salzman & Levy

[57] ABSTRACT

A liner for a flexible rotative drive shaft has a single tube with a multiplicity of spaced-apart, flared sections disposed along its elongated length. The flared sections serve many purposes, but primarily center the liner within an external aluminum tube that houses the flexible shaft and liner assembly. The flared sections also reduce non-uniform lubricant distribution along the drive shaft, longitudinal and radial vibration, and shock. Due to the use of flared sections, the overall weight of the liner is reduced, compared to conventional liners.

13 Claims, 4 Drawing Sheets

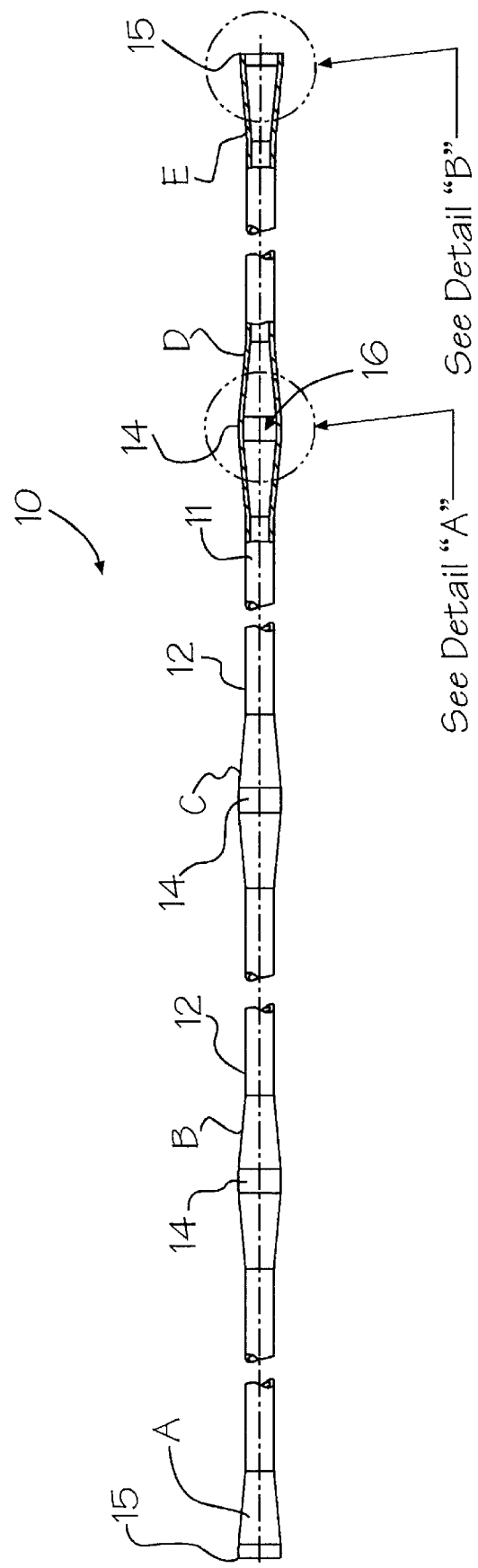

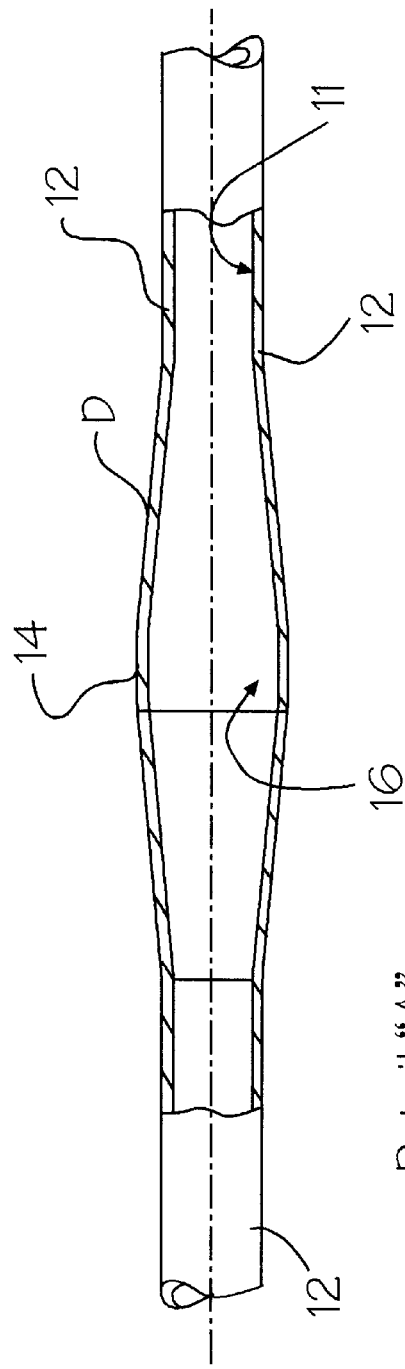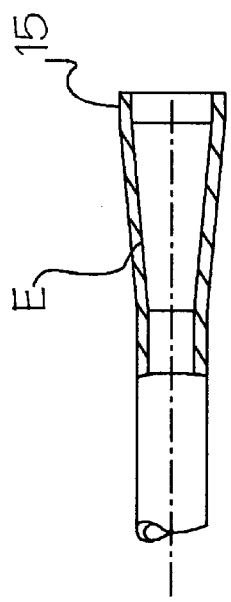

LINER FOR ROTATING DRIVE CABLES

FIELD OF THE INVENTION

The present invention relates to liners for housing a rotative drive shaft and, more particularly, to a liner that aligns, centers, and insulates a flexible drive shaft from its surrounding cable tube support.

BACKGROUND OF THE INVENTION

Flexible, rotatable, drive cables are used in a variety of machines and apparatuses as a means to transmit mechanical rotary motion. These drive cables are commonly employed in machinery, such as concrete vibrators, automobiles, tractors, and lawn and garden equipment, including lawn edgers and weed trimmers. Flexible drive shafts require an insulative lining that centers the cable within its outer support tubing. The lining is usually a sheath of plastic or a composite of metal and plastic.

In a weed trimmer, as a typical example, a flexible shaft is centered within an aluminum tube placed between the gasoline engine or electric motor, and the nylon line cutting head. The flexible shaft is centered within the external aluminum tube by a centering assembly. A typical centering assembly is illustrated in U.S. Pat. No. 5,364,307, issued to John Shaulis on Nov. 15, 1994, for COAXIAL DRIVE CABLE CENTERING APPARATUS. The centering assembly of this patented device features a plastic liner of 6/6 high-temperature nylon, over which a polypropylene star-shaped member is co-extruded. The assembly conforms to the inside diameter of the aluminum tube, as well as to its longitudinal bend configuration. The outer, star-shaped member centers the inner nylon liner, as well as the flexible drive shaft, with respect to the aluminum tube. It also aligns the shaft with respect to the engine and the nylon line cutting head.

One of the drawbacks of the aforementioned liner is the expense of having to extrude two separate sleeves. That is, the star-shaped, propylene member must be co-extruded over the inner 6/6 nylon tube.

Another disadvantage of this liner relates to the double layers, which add thickness, material, weight and manufacturing cost to the liner assembly.

A further drawback of this liner is a result of the vibration caused by the rotating shaft, which vibration can cause premature wear of the shaft and components attached thereto. High frequency vibration can also be harmful to the operator. Prolonged exposure to vibration has been known to cause carpal tunnel syndrome.

Due to the screw effect of the rotating core, the lubricating grease tends to travel or migrate along the smooth inner surface of the liner, resulting in non-uniform grease lubrication when the grease deposits at the bottom end of the edge trimmer.

The present invention features a single centering liner for a flexible shaft that is lower in cost to manufacture, is both lighter and thinner than the prior two-pieced liner, and prevents non-uniform lubrication distribution. It also reduces the transfer of vibration to the outer support housing and, ultimately, to the operator.

As aforementioned, the current invention comprises a single liner element. It is, therefore, an improvement over the prior liner, by reason of a reduction in weight, number of parts and manufacturing complexity.

The liner of this invention comprises a hollow tube having a plurality of flared sections that are spaced apart along its length. The internal bore of the liner provides bearing support for the rotating flexible shaft during its operation.

The flared sections of the tube serve several purposes. The spaced-apart, flared sections center and locate the liner within the outer aluminum tube that supports the flexible shaft and liner assembly. They also reduce vibration, harmonics, and resonance produced by the rotating drive shaft, by providing nodal interference along the length of the tube. The nodal interference results from the change in tube diameter at these flared sections. The increased diameter interrupts vibrational and resonant longitudinal propagation at these spaced-apart sections. These flared sections also reduce radially-propagated vibration and shock forces transmitted from the drive shaft, by separating the drive shaft from the liner at these nodal centers. The expansion of the tube at these nodal points cushions shock and vibration, which is interrupted by a substantial layer of air.

Prior to the insertion of a liner within the end product (e.g., the weed trimmer), the flexible drive shaft is lubricated with grease. During operation, the grease tends to travel along the rotating drive shaft, as aforementioned. The nodal, flared sections of this invention act as retainers of the grease and disrupt the outward migration of the grease along the shaft. The grease pools within the pockets created by the flared sections. During operation, friction from the rotating drive shaft heats and softens the grease pools. The grease then flows from these pockets, thus improving the distribution of the lubricant along the shaft.

DISCUSSION OF RELATED ART

In U.S. Pat. No. 4,747,799, issued to Kato, on May 31, 1988 for ROTATION COUPLING DEVICE WITH MEANS FOR SUPPRESSING STATIONARY WAVE VIBRATIONS, a rotative drive shaft is shown in a tubular sheath. Vibrations are suppressed by inwardly-projecting suppression rings at protruding annular members. The metal or plastic suppression rings hold the shaft in place at the joints.

The present invention is diametrically opposite to this patented device, by reason that the nodes of the liner of the present invention are designed to hold the liner in place with respect to the outer aluminum tube housing, while the inner drive shaft remains rotationally unrestrained within the liner. The current invention does not require suppression rings to reduce vibration of the shaft, but rather uses the insulative effects of the air spaces created at the flared section nodes.

In U.S. Pat. No. 4,716,001 issued to Kottke, on Dec. 29, 1987 for METHOD OF MAKING A FLEXIBLE CABLE ASSEMBLY, an assembly for an automobile speedometer is illustrated. The assembly comprises a tubular casing that houses a core member. The tubular liner of the assembly has a multiplicity of internal ribs that provides support for the core member.

The current invention does not rely on internal ribbing to reduce noise and friction, but uses spaced-apart, flared sections to reduce noise and vibration.

SUMMARY OF THE INVENTION

In accordance with the present invention, there is provided a liner for a flexible rotative shaft assembly. The liner comprises a hollow tube having a plurality of flared sections that are spaced-apart along its length. The internal bore of the liner provides bearing support for the rotating flexible shaft during its operation. The spaced-apart, flared sections of the tube serve several purposes, such as centering and locating the liner within the outer aluminum tube which supports the shaft and liner assembly. They also reduce vibration, harmonics, and resonance produced by the rotating drive shaft, by providing nodal interference along the length of the tube. The nodal interference results from the change in tube diameter at these flared sections. The increased diameter interrupts vibrational and resonant longitudinal propagation at these spaced-apart sections, as well as reduces radial vibration and shock. These flared sections also retain and distribute the lubricant for the flexible, rotative drive shaft.

It is an object of this invention to provide an improved liner for a flexible, rotative drive shaft assembly.

It is another object of the invention to provide a liner for a flexible shaft that aligns, centers, and insulates a flexible drive shaft from its surrounding cable tube support.

It is a further object of this invention to provide a liner for a flexible, rotative drive shaft assembly that provides a multiplicity of benefits, described herein, including reduction of weight, low manufacturing cost, and grease pocket provisions.

BRIEF DESCRIPTION OF THE DRAWINGS

A complete understanding of the present invention may be obtained by reference to the accompanying drawings, when considered in conjunction with the subsequent detailed description, in which:

FIG. 1 illustrates a frontal, cut-away, partial view of the liner of this invention, depicting several of the spaced-apart, flared sections for centering the liner within its external aluminum housing;

FIG. 2 shows an enlarged, detailed view of one of the flared sections of the liner spaced along a mid-portion thereof, as depicted in FIG. 1;

FIG. 3 illustrates an enlarged, detailed view of the flared end-section of the liner, as shown in FIG. 1;

Figure 4:
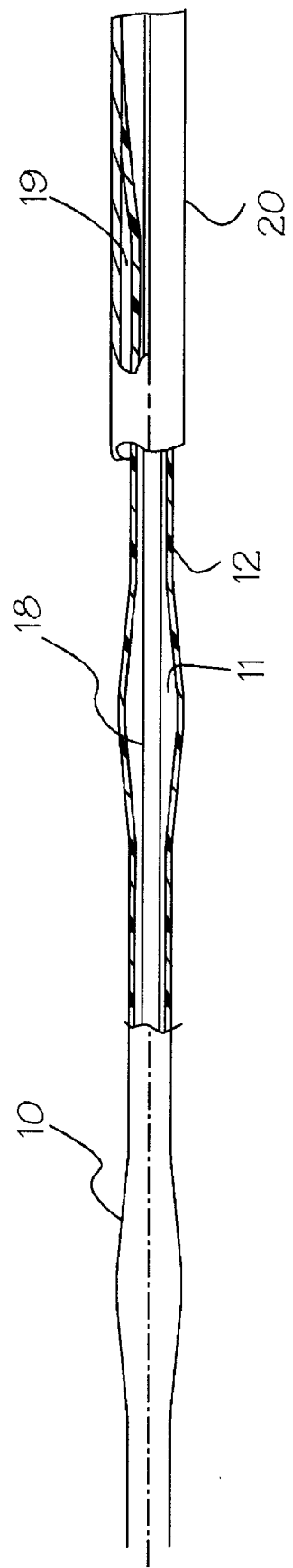
FIG. 4 shows a partially cut-away, plan view of the liner of this invention supporting an internal flexible drive shaft, and itself being supported in an outer aluminum casing.

For purposes of clarity and brevity, like components and elements will bear the same designation and numbering throughout the figures.

DESCRIPTION OF THE PREFERRED EMBODIMENT

Generally speaking, the invention features a liner for a flexible rotative drive shaft. The liner comprises a single tube that has a multiplicity of spaced-apart flared sections disposed along its elongated length. The flared sections serve many purposes, but primarily center the liner within an external aluminum tube that houses the flexible shaft and liner assembly.

Now referring to FIG. 1, an elongated liner 10 for a flexible, rotative drive shaft (not shown) is illustrated with a plurality of flared sections A, B, C, D, and E. Each of these flared sections A through E is shown as a segment of the entire liner 10. A typical flared section in the mid-portion of the liner 10 is represented by flared section D (shown in greater detail in FIG. 2). The flexible drive shaft 18 is rotatively supported within the inner bore 11 of the nominal liner diameter of wall 12, as best viewed with respect to FIG. 4.

The flared, end-sections of the liner 10 are represented by sections A and E, respectively. Typical end section E is illustrated in greater detail in FIG. 3. Of course, the liner 10 may also be cut off and terminated at a non-flared position along the liner body 10, if desired or appropriate for shaft support.

Figure 5:
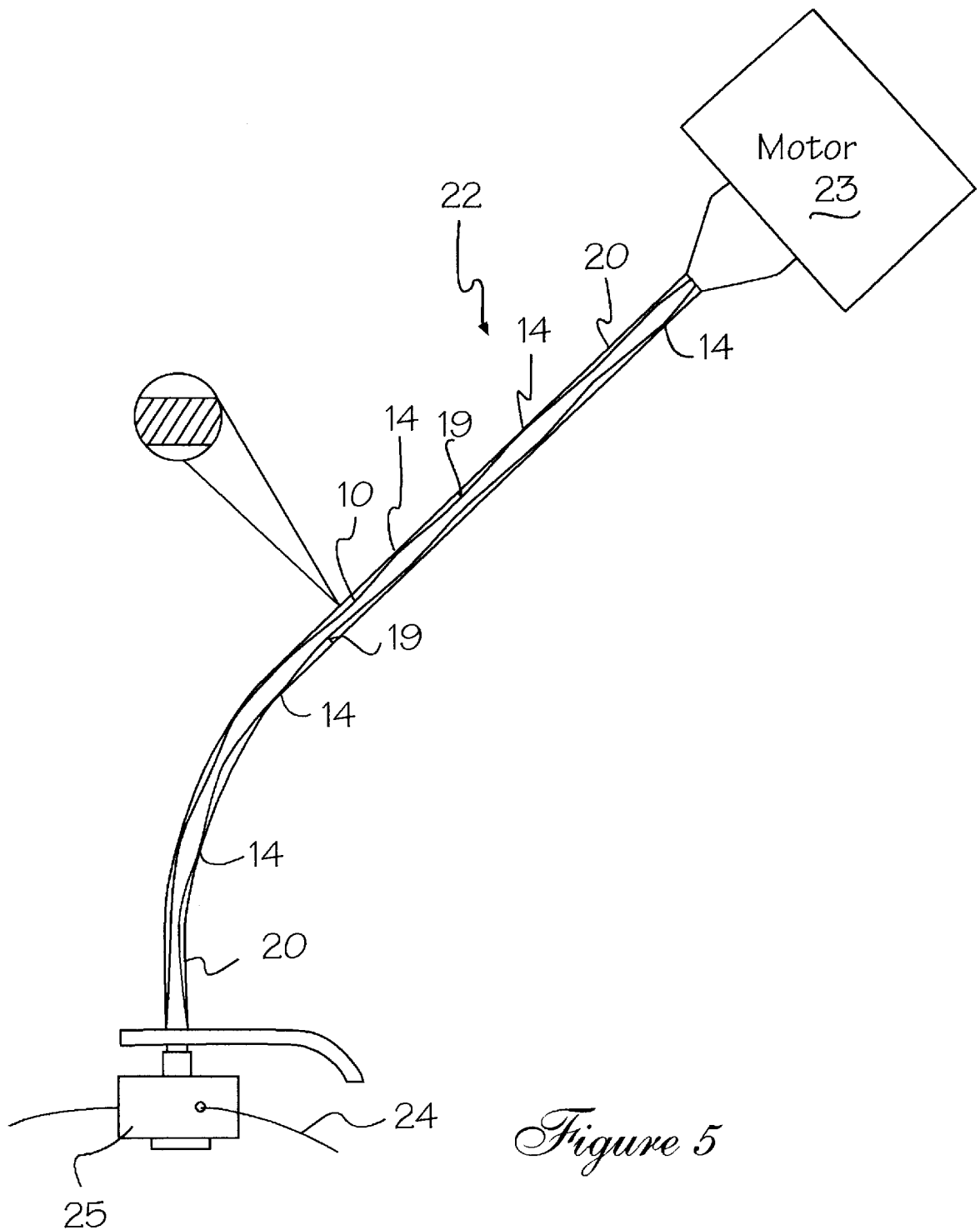
FIG. 5 depicts an in situ, plan view of the liner of this invention disposed within a "weed whacker".

Sections B through D represent the flared sections disposed in a mid-portion of the liner 10. The raised middle portion 14 of the typical flared section D is generally flat. It should also be understood that, although the preferred embodiment of the invention includes a flat flared section D, as shown in FIG. 2, non-flat configurations can also be contemplated in alternate embodiments, as befits the applications. The middle portions 14 are designed to contiguously bear against the inner bore 19 of the aluminum tube housing 20, as best illustrated in FIGS. 4 and 5. FIG. 5 illustrates the liner 10 as used in a typical "weed whacker" 22, the motor 23 of which drives the flexible shaft 18 (FIG. 4) that rotates base 25 comprising flexible fishing line 24. The portion 14 therefore centers the liner 10 within the aluminum housing. The flared sections B, C, and D of the mid-portion of the liner 10 are substantially equally spaced-apart a sufficient distance to support the liner 10 along its entire elongated length. The flared end-sections A and E provide end support within the aluminum tube casing. The highest raised portion 15 of the end-flared sections A and E contiguously contact the peripheral end surface of the inner bore of the aluminum tube casing, and provide both radial and longitudinal centering.

The spaced-apart, flared sections A through E center and locate the liner 10 within the outer aluminum tube that supports the flexible shaft and liner assembly, as aforementioned. They also reduce vibration, harmonics, and resonance produced by the rotating drive shaft, by providing nodal interference along the length of the liner 10. The nodal interference results from the change in tube diameter at these flared sections. The increased diameter interrupts vibrational and resonant longitudinal propagation at these spaced-apart sections.

These flared sections A through E also reduce radially-propagated vibration and shock forces transmitted from the drive shaft, by separating the drive shaft from the liner 10 at these nodal centers. The expansion of the tube at these nodal points cushions shock and vibration, which is interrupted by a substantial layer of air 16 between the nominal outer shaft diameter and the flare.

Prior to the insertion of a liner within a weed trimmer, for example, the flexible drive shaft is lubricated with grease. During operation, the grease tends to travel along the rotating drive shaft. The nodal, flared sections B through D of this invention act as retainers of the grease, or grease pockets, and disrupt the outward migration of the grease towards the end(s) of the shaft. The grease is allowed to pool within the pockets created by the flared sections. During operation, friction from the rotating drive shaft heats and softens the grease pools. The grease then flows from these pockets, thus improving the distribution of the lubricant along the shaft.

The drawings are exemplary, but the invention can comprise more or less than five flared sections, depending upon the length of the liner 10 and the particular product design in which it is utilized. The flared section A–D cross-section can comprise a round, oval, regular or irregular polygon, square, rectangular, or any shape that a customer requires. Flared section A–D may also be solid if weight reduction and grease retention are not considerations for the specific applications.

The liner 10 can be fabricated from plastic or metal, but is preferably manufactured from 6/6 high temperature nylon or an equivalent, because of its heat resistant qualities and strength.

The liner 10 can be extruded, blow molded or fabricated by any other means known in the art, and is easily fabricated upon a plastic multibump extrusion machine manufactured by the Harrel Company of East Norwalk, Conn.

The liner 10 of this invention has particular usage for flexible drive shafts used in lawn and garden machinery, such as weed trimmers and edgers, but is not limited to this type of machinery. These liners would find use in many other apparatuses where weight and material costs are a factor.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A liner assembly for a flexible drive shaft, comprising a flexible drive shaft, an elongated hollow tube having an inner and an outer wall, said inner wall of said hollow tube for supporting said flexible drive shaft therein, said elongated hollow tube having a plurality of spaced-apart, integrally formed flared sections disposed along a length thereof and intermediate elongated narrower sections, said flared sections forming internal pockets therein, and having a greater radius than that of said intermediate elongated narrower sections, an outer housing having an inner bore, said spaced-apart, flared sections acting to center said liner with respect to said inner bore of said outer housing and acting to retain lubricant in said internal pockets to lubricate said inner flexible drive shaft, said flared sections also serving to reduce weight, vibration and shock within the assembly.

2. The liner assembly in accordance with claim 1, wherein said flared sections of said hollow tube comprise mid-portion flared sections and end-portion flared sections.

3. The liner assembly in accordance with claim 2, wherein said mid-portion flared sections of said hollow tube are substantially equally spaced apart along the length of said liner.

4. The liner of the liner assembly in accordance with claim 1, wherein said hollow tube comprises 6/6 high-temperature nylon.

5. A liner in combination with a flexible drive shaft and an outer housing, said outer housing having an inner bore, said liner comprising elongated hollow tube sections for supporting said flexible drive shaft therein, each of said elongated hollow tube sections being intermediate of a plurality of spaced-apart, integrally formed flared sections disposed along a length of said liner, said spaced-apart, flared sections having a greater radius than that of said intermediate elongated hollow tube sections, and acting to center said liner with respect to said inner bore of said outer housing, said flared sections also serving to reduce weight, vibration and shock within the flexible drive shaft assembly.

6. The liner in accordance with claim 5, wherein said flared sections comprise mid-portion flared sections and end-portion flared sections.

7. The liner in accordance with claim 6, wherein said mid-portion flared sections are substantially equally spaced apart along the length of said liner.

8. The liner in accordance with claim 5, comprising 6/6 high-temperature nylon.

9. A single liner for a flexible drive shaft assembly having an inner drive shaft and an outer housing including an inner bore therein, said single liner comprising elongated hollow tube sections for supporting a flexible drive shaft therein, each of said elongated hollow tube sections being intermediate a plurality of spaced-apart, flared sections disposed along a length thereof, said spaced-apart, flared sections having a greater radius than that of said intermediate elongated hollow tube sections, and acting to center said liner with respect to said inner bore of said outer housing, said flared sections having means for retaining lubricant for said flexible drive shaft, whereby uniform distribution of said lubricant in said flexible drive shaft assembly will be maintained.

10. The liner in accordance with claim 9, wherein said flared sections comprise mid-portion flared sections and end-portion flared sections.

11. The liner in accordance with claim 10, wherein said mid-portion flared sections are substantially equally spaced apart along the length of said liner.

12. The liner in accordance with claim 9, comprising 6/6 high-temperature nylon.

13. The liner in accordance with claim 9, wherein said spaced-apart, flared sections are positioned for supporting said liner entering a curved section thereof to ensure proper support of the flexible drive shaft.

* * * * *